United States Patent [19]

Davis

[11] Patent Number: 5,471,663
[45] Date of Patent: Nov. 28, 1995

[54] EXPANDED MICROCOMPUTER SYSTEM FOR CONTROLLING RADIO FREQUENCY INTERFERENCE

[75] Inventor: Walter L. Davis, Coral Springs, Fla.

[73] Assignee: Motorola, Inc., Schaumburg, Ill.

[21] Appl. No.: 83,584

[22] Filed: Jul. 1, 1993

[51] Int. Cl.$^6$ .............................. H04B 1/10; H03K 3/01
[52] U.S. Cl. ...................... 455/296; 455/310; 327/108; 327/376; 327/377; 364/240.3; 364/DIG. 1
[58] Field of Search ......................... 455/296, 310–312, 455/343; 375/99; 395/550; 364/240.3, 270.7, 270.2; 327/108, 376, 377, 427, 434, 436, 437; 370/85.1, 84

[56] References Cited

U.S. PATENT DOCUMENTS

| | | |
|---|---|---|
| 3,801,831 | 4/1974 | Dame . |
| 4,606,076 | 8/1986 | Davis . |
| 4,612,466 | 9/1986 | Stewart ................................. 307/585 |
| 4,879,758 | 11/1989 | DeLuca et al. . |
| 5,086,501 | 2/1992 | DeLuca et al. . |
| 5,280,587 | 1/1994 | Shimodaira et al. ................ 395/550 X |
| 5,293,081 | 3/1994 | Chiao et al. ............................. 307/270 |
| 5,311,514 | 5/1994 | Cook ...................................... 370/85.1 |
| 5,338,987 | 8/1994 | Tomasetti et al. ...................... 307/570 |

FOREIGN PATENT DOCUMENTS 0511511  4/1992  European Pat. Off. ............... 455/296

*Primary Examiner*—Chi H. Pham
*Attorney, Agent, or Firm*—Kelly A. Gardner; John H. Moore; Daniel K. Nichols

[57] ABSTRACT

A radio receiver (40) for receiving an RF signal comprises receiving circuitry (42) for receiving and demodulating the RF signal and a microcomputer (44) coupled to the receiving circuitry (42) for enabling and disabling the receiving circuitry (42) at predetermined times. The radio receiver (40) further comprises an expansion chip (68) coupled to and controlled by the microcomputer (44) for communicating therewith to further process the RF signal. Communication between the microcomputer (44) and the expansion chip (68) occurs at a first speed when the receiving circuitry (42) is enabled and at a second speed faster than the first speed when the receiving circuitry (42) is disabled.

22 Claims, 5 Drawing Sheets

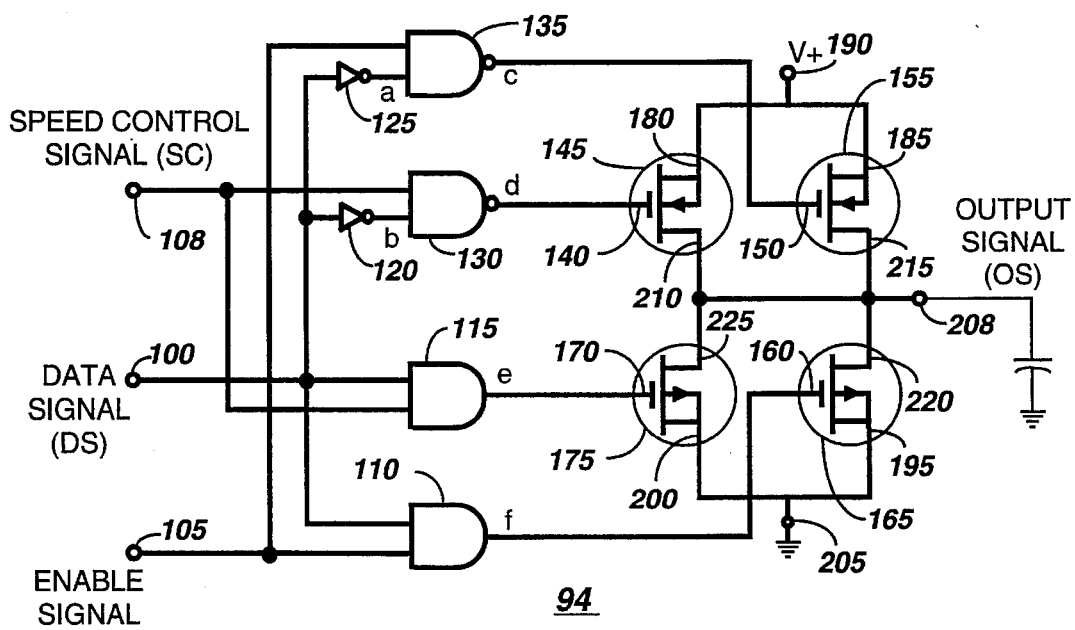

FIG. 4

| ENABLE | LOW | | | | HIGH | | | |
|---|---|---|---|---|---|---|---|---|
| SC | LOW | | HIGH | | LOW | | HIGH | |
| DS | LOW | HIGH | LOW | HIGH | LOW | HIGH | LOW | HIGH |
| a | HIGH | LOW | HIGH | LOW | HIGH | LOW | HIGH | LOW |
| b | HIGH | LOW | HIGH | LOW | HIGH | LOW | HIGH | LOW |
| c | HIGH | HIGH | HIGH | HIGH | LOW | HIGH | LOW | HIGH |
| d | HIGH | HIGH | LOW | HIGH | HIGH | HIGH | LOW | HIGH |
| e | LOW | LOW | LOW | HIGH | LOW | LOW | LOW | HIGH |
| f | LOW | LOW | LOW | LOW | LOW | HIGH | LOW | HIGH |
| 145 | OFF | OFF | ON | OFF | OFF | OFF | ON | OFF |
| 175 | OFF | OFF | OFF | ON | OFF | OFF | OFF | ON |
| 155 | OFF | OFF | OFF | OFF | ON | OFF | ON | OFF |
| 165 | OFF | OFF | OFF | OFF | OFF | ON | OFF | ON |

FIG. 5

| SC | LOW | | HIGH | |
|---|---|---|---|---|
| DS | LOW | HIGH | LOW | HIGH |
| a | HIGH | LOW | HIGH | LOW |
| b | HIGH | HIGH | LOW | HIGH |
| c | LOW | LOW | LOW | HIGH |
| 430 | ON | OFF | ON | OFF |
| 440 | OFF | ON | OFF | ON |
| 450 | OFF | OFF | ON | OFF |
| 460 | OFF | OFF | OFF | ON |

EXPANDED MICROCOMPUTER SYSTEM FOR CONTROLLING RADIO FREQUENCY INTERFERENCE

FIELD OF THE INVENTION

This invention relates in general to microcomputers, and more specifically to an expanded microcomputer system for providing radio frequency interference control.

BACKGROUND OF THE INVENTION

Microcomputers are widely used in paging receivers and a number of other radio frequency (RF) communication devices. Because, in recent years, paging receivers have begun to include a greater number of features, such as alphanumeric displays and real time clocks, complex circuitry has been added to support the additional operations. At the same time, however, paging receivers have become smaller. Therefore, the additional circuitry, which is sometimes very complex, is often integrated and included in microcomputers, resulting in larger, less efficient microcomputers which cannot be implemented in a cost effective manner.

One approach to solving this problem is to use an expanded microcomputer system in which circuits including a processing unit, a random access memory (RAM), a read only memory (ROM), programmable elements, etc. are implemented on more than one chip. For instance, a first chip, e.g., a master microcomputer, can have included therein a central processing unit, memory, and various other processing elements, while a second chip, e.g., a slave microcomputer or other type of expansion chip, can be used to incorporate additional processing elements, such as expanded ROM. The two chips are inter-connected by a communication bus which allows two-way communication therebetween. This solution, however, is often not feasible for use in RF communication devices, such as paging receivers, because the communication bus often generates intense RF interference that interferes with the operation of the receiver. This interference is often so severe that information transmitted to the paging receiver can be erroneously received or entirely missed.

Thus, what is needed is a method and apparatus for controlling RF interference in an expanded microcomputer system having one or more chips inter-connected to a microcomputer by a communication bus.

SUMMARY OF THE INVENTION

According to an aspect of the present invention, a radio receiver for receiving a radio frequency (RF) signal comprises receiving circuitry for receiving and demodulating the RF signal and a microcomputer coupled to the receiving circuitry for enabling and disabling the receiving circuitry at predetermined times. The radio receiver further comprises an expansion chip coupled to and controlled by the microcomputer for communicating therewith to further process the RF signal. Communication between the microcomputer and the expansion chip occurs at a first speed when the receiving circuitry is enabled and at a second speed faster than the first speed when the receiving circuitry is disabled.

According to another aspect of the present invention, an expanded microcomputer system includes a microcomputer coupled by a communication bus to an expansion chip for communicating therewith to process RF signals received by receiving circuitry. A method for controlling RF interference in the expanded microcomputer system comprises the steps of enabling the receiving circuitry at a first predetermined time such that the receiving circuitry is able to receive an RF signal and communicating with the expansion chip at a first speed with the receiving circuitry is enabled. The method further comprises the steps of disabling the receiving circuitry at a second predetermined time such that the receiving circuitry is unable to receive the RF signal and communicating with the expansion chip at a second speed faster than the first speed when the receiving circuitry is disabled.

According to still another aspect of the present invention, a radio receiver for receiving an RF signal comprises receiving circuitry for receiving and demodulating the RF signal and a microcomputer coupled to the receiving circuitry for enabling and disabling the receiving circuitry at predetermined times. The radio receiver further comprises an expansion chip coupled to and controlled by the microcomputer for communicating therewith to further process the RF signal. Communication between the microcomputer and the expansion chip is inhibited when the receiving circuitry is enabled, and communication between the microcomputer and the expansion chip is enabled when the receiving circuitry is disabled.

BRIEF DESCRIPTION OF THE DRAWINGS

FIG. 4 is an electrical circuit diagram of a two-directional, dual speed bus driver circuit for use with the communication bus of FIG. 2 in accordance with the preferred embodiment of the present invention.

FIG. 5 is a truth table showing the states of various nodes and transistors of the two-directional, dual speed bus driver circuit of FIG. 4 in accordance with the preferred embodiment of the present invention.

DESCRIPTION OF A PREFERRED EMBODIMENT

Figure 1:
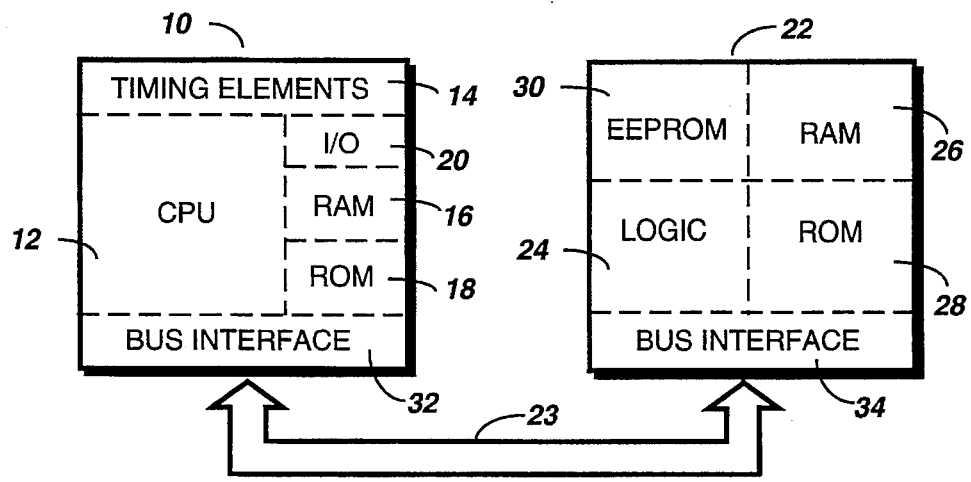
FIG. 1 is an illustration of a conventional expanded microcomputer system in which a microcomputer is coupled to an expansion chip by a communication bus.

FIG. 1 is an illustration of a conventional expanded microcomputer system included in a radio receiver or other radio frequency (RF) communication device. As shown, a microcomputer 10 comprises a central processing unit (CPU) 12 for controlling the operation of the radio receiver. The microcomputer 10 further comprises other conventional elements, such as timing elements 14, a random access memory (RAM) 16, a read only memory (ROM) 18, and an input/output (I/O) port 20 for providing signals to and receiving signals from peripheral circuitry, e.g., a receiver (not shown).

In recent years, radio receivers have been designed to include a greater number of features, such as real-time clocks, alphanumeric displays, and silent (tactile) alerts, all of which require additional processing circuitry. The added processing circuitry often exceeds the amount of circuitry which can be economically added to a single chip microcomputer. As a result, an expansion chip 22, which may be, for example, a "slave" microcomputer is coupled to the microcomputer 10 via a communication bus 23, thereby forming an expanded microcomputer system. The expansion chip 22 comprises additional circuit elements, such as logic elements 24, additional RAM 26, additional ROM 28, and an EEPROM 30 (electrically erasable programmable read only memory). A bus interface 32, 34 included in each chip, i.e., the microcomputer 10 and the expansion chip 22, drives the communication bus 23 with data to be transmitted thereover. In this manner, the microcomputer 10 can easily access information stored in the expansion chip 22.

The conventional expanded microcomputer system, which provides for communication between multiple chips, advantageously limits the size and therefore increases the efficiency of the microcomputer 10 controlling the radio receiver. However, a drawback to the use of a expanded microcomputer system is that communication over the bus 23 can interfere with the RF performance of the radio receiver. Because the communication between the two chips typically occurs at a high data rate, the rise and fall times of the data are relatively fast and, as a result, noise is generated which can desensitize the radio receiver. If the interference is intense enough, the RF performance of the radio receiver can be degraded to such an extent that information can be erroneously received or even missed.

Figure 2:
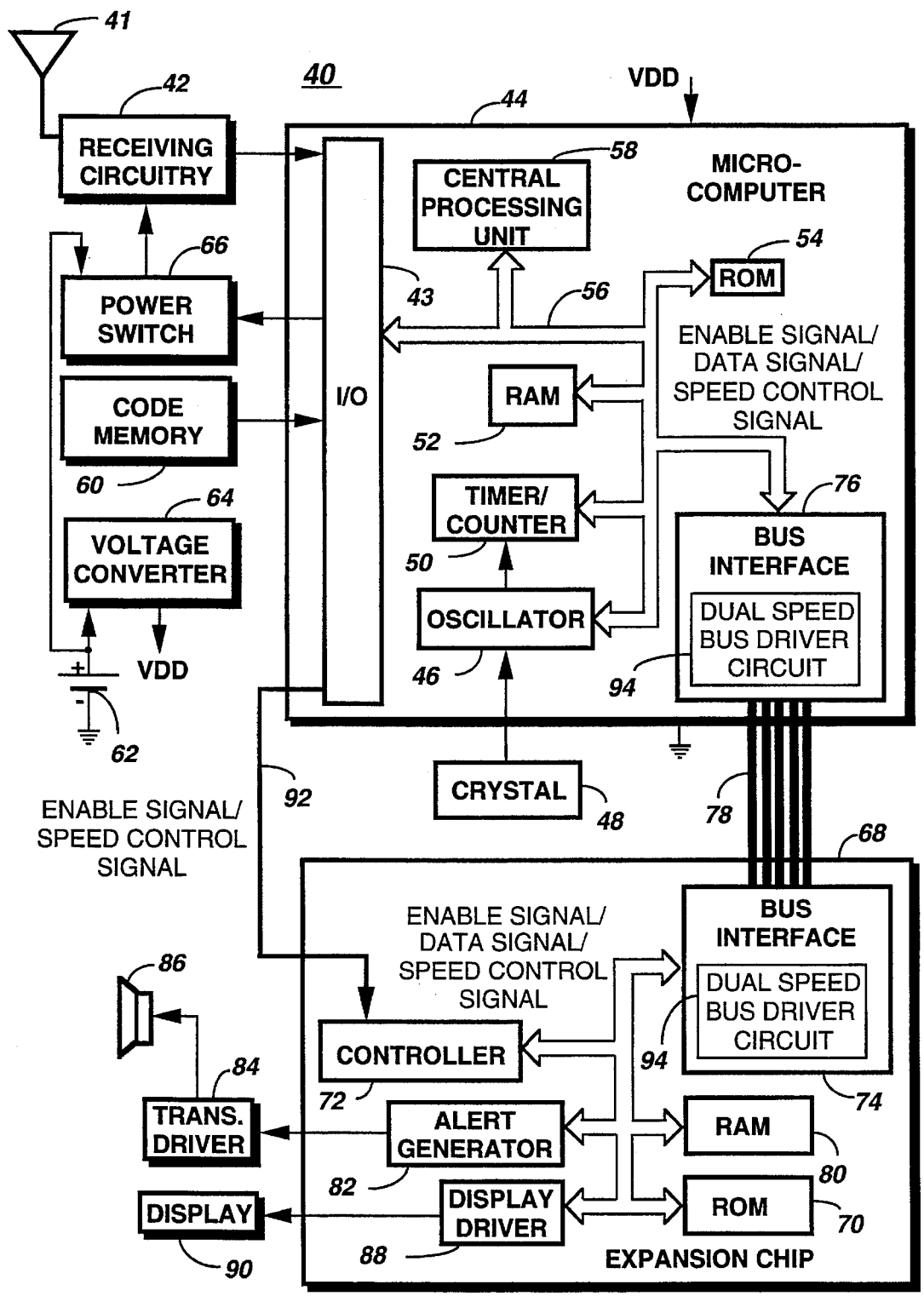
FIG. 2 is an electrical block diagram of a radio receiver having a microcomputer coupled to an expansion chip by a communication bus in accordance with a preferred embodiment of the present invention.

FIG. 2 is an electrical block diagram of a radio receiver 40 in accordance with a preferred embodiment the present invention. For purposes of description, it will be assumed that one of the well known paging signaling protocols, such as Golay Sequential Code (GSC) or the Post Office Code Standardization Advisory Group (POCSAG) code signaling protocol, is utilized to deliver information to the radio receiver 40. When a signaling protocol, such as the POCSAG signaling protocol, is used to encode a selective call message into an RF signal, the message is encoded together with an address identifying the radio receiver 40 to which the message is directed, subsequent to which the RF signal is transmitted. The transmitted RF signal is intercepted by an antenna 41, which couples the RF signal to receiving circuitry 42. The receiving circuitry 42 processes the RF signal in a manner well known to one of ordinary skill in the art to recover therefrom a stream of digital data, which is provided via an input/output (I/O) port 43 to a microcomputer 44 for controlling the operation of the radio receiver 40.

The microcomputer 44 preferably comprises an oscillator 46 which generates timing signals utilized in the operation of the microcomputer 44. A crystal 48, or a crystal oscillator (not shown), is coupled to the inputs of the oscillator 46 to provide a reference signal for establishing microcomputer timing. A timer/counter 50 couples to the oscillator 46 and provides programmable timing functions which are utilized in controlling the operation of the radio receiver 40. A RAM 52 stores variables derived during recovered signal processing, and a ROM 54 stores at least a portion of subroutines executed by the microcomputer 44. The oscillator 46, timer/counter 50, RAM 52, and ROM 54 couple through an internal bus 56 to a central processing unit (CPU) 58 which performs subroutines stored in the ROM 54 to control the operation of the microcomputer 44.

The recovered address and message information is coupled from the output of the receiving circuitry 42, as described above, to the microcomputer 44. The address information is processed by the CPU 58 and, when the recovered address is the same as an address stored in a code memory 60 coupled via the I/O port 43 to the microcomputer 44, the message information is stored in the RAM 52. Subsequently, an alert is generated and the message information can be displayed, as will be explained in greater detail below.

The radio receiver 40, e.g., a portable pager, is powered by a battery 62. A voltage converter 64 is provided which steps up the voltage generated by the battery 62 to a higher level (VDD), such as that required for the operation of the microcomputer 44. According to the present invention, the radio receiver 40 utilizes well known battery saving techniques and methods to reduce current drain on the battery 62, thereby increasing the life of the battery 62. Battery saving operation is controlled by the CPU 58 with battery saving signals which are directed over the internal bus 56 to the I/O port 43, which couples to a power switch 66. Power is periodically supplied to the receiving circuitry 42 by the power switch 66, thereby enabling the operation of the receiving circuitry 42 at predetermined times during which selective call messages directed to the radio receiver 40 are transmitted. During other predetermined times when messages will typically not be transmitted to the radio receiver 40, the receiving circuitry 42 is disconnected from the battery 62 by the power switch 66.

As described above, it is desirable to limit the amount and complexity of circuitry included in the microcomputer 44. Therefore, the radio receiver 40 further comprises an expansion chip 68, e.g., a "slave" or peripheral circuit, for incorporating additional circuitry, which provides for additional paging features. By way of example, the expansion chip 68 as shown includes a ROM 70 for expanding the storage capabilities of the radio receiver 40 and a dedicated controller 72 for retrieving information therefrom and generating a data signal for transmission to the microcomputer 44. Preferably, the data signal is provided to a bus interface 74, which is coupled to a bus interface 76 internal to the microcomputer 44 by an external communication bus 78. The expansion chip 68 further includes a RAM 80, which temporarily stores data provided by the microcomputer 44. The data provided by the microcomputer 44 can, for instance, include an alert signal, in response to which an alert generator 82 directs a transducer driver 84 to activate a transducer 86, thereby announcing reception of a selective call message to a user of the radio receiver 40. The microcomputer 44 thereafter provides the selective call message to the expansion chip 68 over the communication bus 78. The selective call message is transferred to a display driver 88 for activating a display 90, such as an LCD, in response to which the selective call message is visibly presented. In this manner, the microcomputer 44, the expansion chip 68, and the communication bus 78 coupled therebetween form an expanded microcomputer system for processing received messages.

Unlike conventional multi-chip systems, the expanded microcomputer system according to the present invention operates in such a manner that interference with the receiving circuitry 42 is controlled and minimized by controlling both the clock frequency and the rise and fall times of the communication bus 78. As mentioned briefly herein above, the performance of conventional radio devices is often degraded due to noise generated by communication between two or more chips or microcomputers. In the present invention, this type of noise is reduced because communication over the communication bus 78 is limited when the receiving circuitry 42 is enabled, as may be better understood by referring to FIG. 3.

Figure 3:
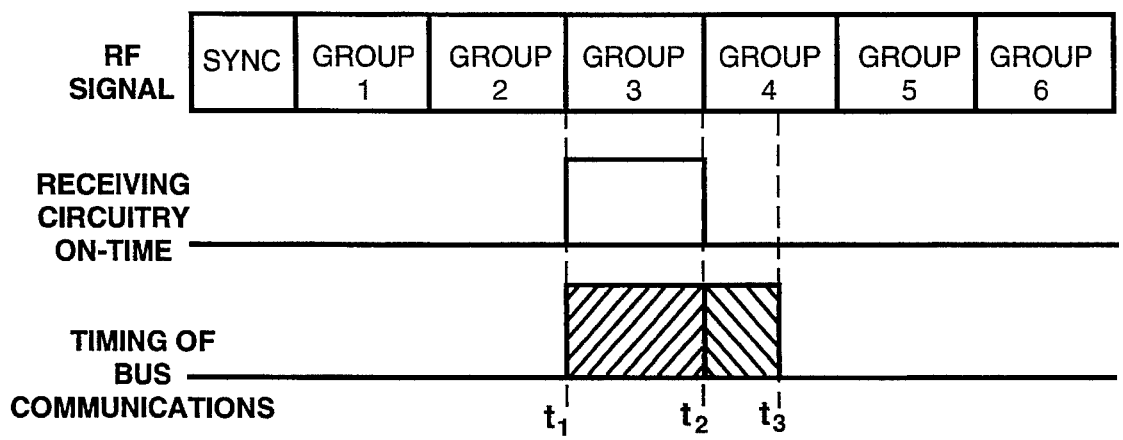
FIG. 3 is a timing diagram depicting the on-time of receiving circuitry included in the radio receiver of FIG. 2 and the timing of communications over the communication bus of FIG. 2 in accordance with the preferred embodiment of the present invention.

FIG. 3 is a timing diagram depicting the operation of the receiving circuitry 42 and the timing of bus communications associated therewith in accordance with a preferred embodiment of the present invention. As shown, the receiving circuitry 42 is enabled in the manner described above at a first predetermined time, $t_1$, subsequent to which messages intended for reception by the radio receiver 40 are received. At a later time, $t_2$, the receiving circuitry 42 is disabled to implement battery saving, thereby reducing the drain on the battery 62 (FIG. 2). In accordance with a preferred embodiment of the present invention, communication between the microcomputer 44 and the expansion chip 68 over the communication bus 78 occurs at a low data rate during the on-time of the receiving circuitry 42. During this time, the rise and fall times of the data signals transmitted over the communication bus 78 are increased, i.e., the data rate is decreased, such that minimal RF interference is generated. It is well known that the magnitudes of the high frequency harmonic signals generated by a digital waveform are inversely proportional to the rise and fall times of the signal. Thus, by increasing the rise and fall times of the signal, the RF performance of the receiving circuitry 42 is maximized, and information is not missed due to desensitization of the receiving circuitry 42. After the receiving circuitry 42 is disabled at $t_2$, communication over the communication bus 78 occurs, during the time period defined by $t_2$ and $t_3$, at a high data rate, during which rise and fall times of the data signal are decreased significantly, i.e., the data rate is significantly faster. Although the slower rise and fall times can generate intense RF interference, the interference does not affect the performance of the radio receiver 40 because the receiving circuitry 42 is disabled.

Returning to FIG. 2, the data rate is selected by the CPU 58, which generates an appropriate "speed control" signal depending upon whether the receiving circuitry 42 is enabled or disabled. When the receiving circuitry 42 is disabled, the CPU 58 provides a low speed data signal and a speed control signal having a low voltage level over the internal bus 56 to the bus interface 76. Additionally, the speed control signal having the low voltage is provided over an external line 92 to controller 72, in response to which the controller 72 forwards the low voltage speed control signal to the bus interface 74 and generates any data signals to be transmitted at a slow speed. Conversely, when the receiving circuitry 42 disabled, a speed control signal having a high voltage level is provided to the bus interfaces 74, 76, and the data signals generated by the controller 72 and the CPU 58 are generated at a higher speed. Additionally, as will be described in greater detail below, the CPU 58 provides an "enable" signal having a high voltage level over the internal bus 56 to the bus interface 76 when the microcomputer 44 is to transmit information to the expansion chip 68. Alternatively, when the expansion chip 68 is to transmit information to the microcomputer 44, the CPU 58 transmits, over the external line 92, an enable signal to the controller 72 of the expansion chip 68, in response to which the controller 72 provides the enable signal to the bus interface 74.

A preferred method by which dual speed communication between the microcomputer 44 and the expansion chip 68 can be accomplished is by including a dual speed, two-directional bus driver circuit 94 in each of the bus interfaces 74, 76, as may be better understood by referring to FIG. 4. FIG. 4 is an electrical circuit diagram of the dual speed, two-directional bus driver circuit 94 in accordance with the preferred embodiment of the present invention. The bus driver circuit 94 comprises a first terminal 100 for receiving a data signal (DS), a second terminal 105 for receiving the enable signal generated by the CPU 58, and a third terminal 108 for receiving the speed control signal (SC) generated by the CPU 58. All of the signals, i.e., the data, speed control, and enable signals, can be received at high and low voltage levels.

The first terminal 100 is coupled to a first input of a first AND gate 110, a first input of a second AND gate 115, the input of a first inverter 120, and the input of a second inverter 125. The output of the first inverter 120 is coupled to a first input of a first NAND gate 130, and the output of the second inverter 125 is coupled to a first input of a second NAND gate 135. The second terminal 105 is coupled to the second input of AND gate 110 and to the second input of NAND gate 135. The third terminal 108 is coupled to the second input of AND gate 115 and to the second input of NAND gate 130.

The output of NAND gate 130 is coupled to the gate electrode 140 of a first transistor 145, which is preferably an n-channel field effect transistor (FET). Additionally, the output of NAND gate 135 is coupled to the gate electrode 150 of a second transistor 155, which is also preferably an n-channel FET. The output of AND gate 110 is coupled to the gate electrode 160 of a third transistor 165, which is preferably a p-channel FET, and the output of AND gate 115 is coupled to the gate electrode 170 of a fourth transistor 175, which is preferably a p-channel FET.

According to the present invention, the source electrodes 180, 185 of transistors 145, 155, respectively, are coupled to a fourth terminal 190, while the source electrodes 195, 200 of transistors 165, 175, respectively, are coupled to a fifth terminal 205. Preferably, a positive voltage (V+) is provided at the fourth terminal 190, and a supply voltage of approximately zero volts, i.e., ground, is provided at the fifth terminal 205. A sixth terminal 208 supplies an output signal (OS) over the communication bus 78 (FIG. 2) and is coupled to the drain electrodes 210, 215, 220, 225 of each of the four transistors 145, 155, 165, 175, respectively.

The circuit elements of the bus driver circuit 94 are, in accordance with the preferred embodiment of the present invention, integrated onto the microcomputer 44 and the expansion chip 68. However, it will be recognized that, alternatively, the circuit elements of the bus driver circuit 94 can be implemented by discrete components, such as the following, which are all manufactured by Motorola, Inc. of Schaumburg, Ill.:

| circuit element | part number |
| --- | --- |
| inverters 120, 125 | HC04 |
| AND gates 110, 115 | HC08A |
| NAND gates 130,135 | HC00A |
| transistors 145, 155, 165, 175 | MPM3004 |

The signal flow of the bus driver circuit 94 can be easily followed by further referencing FIG. 5 together with FIG. 4. FIG. 5 is a truth table showing the states of nodes a, b, c, d, e, and f, and the operational states of transistors 145, 155, 165, 175 with respect to the data signal (DS) supplied at terminal 100, the enable signal supplied at terminal 105, and the speed control signal (SC) supplied at terminal 108. As described above, the bus driver circuit 94 within each device is enabled to transmit information and disabled when information is being received. Preferably, the bus driver circuit 94 is disabled when the enable signal is low and the speed control signal is low. When the enable signal is low, the output (node c) of NAND gate 135 is high, thereby rendering transistor 155 non-conductive, and the output (node f) of AND gate 110 is low, thereby rendering transistor 165 non-conductive. When the speed control signal is low as well, the output (node d) of NAND gate 130 is high, which renders transistor 145 non-conductive. Additionally, a low speed control signal causes the output (node e) of AND gate 115 to go low, thereby rendering transistor 175 non-conductive. As a result, terminal 208, where the output signal is provided, remains uncoupled to either the V+ or ground, which effectively disables the bus driver circuit 94.

Preferably, the bus driver circuit 94 receives at terminal 105 an enable signal having a high voltage level when the bus driver circuit 94 is to generate an output signal. When, in addition to a high enable signal, the bus driver circuit 94 is provided with a low voltage speed control signal at terminal 108, the bus driver circuit 94 is enabled for low speed communication.

When the speed control signal is low, as described above, the outputs (nodes d and e) of NAND gate 130 and AND gate 115 remain high and low, respectively, and therefore transistors 145, 175 remain non-conductive regardless of the voltage levels of the enable signal and the data signal. The states of nodes c and f, however, vary as the voltage levels of the enable signal and the data signal vary. When the enable signal is high and the data signal is low, the output (node a) of inverter 125 is high, and the output (node c) of NAND gate 135 is low, which renders transistor 155 conductive. At the same time, the output (node f) of NAND gate 110 goes low, rendering transistor 165 non-conductive. In this situation, therefore, transistor 155 couples V+ to terminal 208, thus providing a first predetermined current for effectively charging a capacitive load, e.g., the microcomputer 44 or the expansion chip 68, coupled to terminal 208. When the enable signal and the data signal are both high, the output (node a) of inverter 125 is low, and the output (node c) of NAND gate 135 is high, which renders transistor 155 non-conductive. However, the output (node f) of AND gate 110 is high, which renders transistor 165 conductive. As a result, terminal 208 is coupled, via transistor 165, to ground, thereby effectively discharging the capacitive load.

Figure 6:
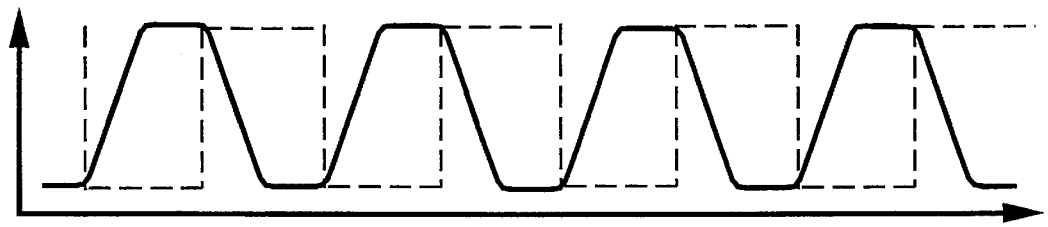
FIG. 6 is a signal diagram depicting a data signal applied to the bus driver circuit of FIG. 4 and an output signal resulting therefrom when a bus control signal is low in accordance with the preferred embodiment of the present invention.

FIG. 6 is a signal diagram depicting the data signal (shown in dashed lines) provided at terminal 100 and the resulting output signal (shown in solid lines) at terminal 208 when the enable signal is high and the speed control signal is low. It can be seen that the capacitive load, i.e., the microcomputer 44 (FIG. 2) or the expansion chip 68, coupled to terminal 208 is charged and discharged as the data signal goes low and high, resulting in predetermined rise and fall times of the output signal. In accordance with the preferred embodiment of the present invention, the rise and fall times of the output signal are relatively slow when the speed control signal is low, i.e., when the receiving circuitry 42 is enabled, due to the bus interface output 208 sourcing and sinking a relatively low output current. It will be appreciated by one of ordinary skill in the art that the rise and fall times can be adjusted by choosing the geometries of the transistors 155, 165, thereby controlling the drain-to-source resistances ($R_{DS}$) and the resultant current at which the bus driver circuit 94 operates.

Returning to FIGS. 4 and 5, the CPU 58 (FIG. 2) provides a speed control signal having a high voltage level to terminal 108 when communication over the bus 78 is to occur at a high data rate. When the speed control signal is high and the data signal is low, the output (node b) of inverter 120 is high, and the output (node d) of NAND gate 130 is low. As a result, transistor 145 is conductive. When the enable signal is high at the same time, as described above, transistor 155 is conductive as well. Therefore, both transistors 145, 155 couple V+ to terminal 208. When transistors 145, 155 have equivalent current handling capabilities and equivalent $R_{DS}$, the capacitive load coupled to terminal 208 is charged approximately twice as fast as when only transistor 155 is conductive. It will be appreciated, however, that the rate at which the capacitive load is charged depends upon the selection of the geometries of transistors 145, 150.

When all three of the signals, i.e., the speed control, enable, and data signals, are high, the outputs (nodes a and b) of inverters 125, 120 are low, and, as a result, the outputs (nodes c and d) of NAND gates 130, 135 are high. Therefore, both transistors 145, 155 are rendered non-conductive. The outputs (nodes e and f) of AND gates 110, 115, however, are high, which renders transistors 165, 175 conductive. In this situation, transistors 165, 175 couple terminal 208 to ground, thereby discharging the capacitive load at a faster rate than when only transistor 165 provides a path between terminal 208 and ground, such as occurs when the speed control signal is low.

Figure 7:
FIG. 7 is a signal diagram depicting a data signal applied to the bus driver circuit of FIG. 4 and an output signal resulting therefrom when a bus control signal is high in accordance with the preferred embodiment of the present invention.

Referring next to FIG. 7, a signal diagram depicts the data signal (shown in dashed lines) and the resulting output signal (shown in solid lines) when the speed control signal is high and the enable signal is high. As shown, the rise and fall times of the output signal are relatively fast compared to the signals of FIG. 6 because, when the speed control signal is high, two transistors at a time operate in parallel, thereby providing for higher current operation of the bus driver circuit 94 (FIG. 4). Conversely, when the speed control signal is low and the enable signal is high, transistors 145, 175 are removed from operation, and a smaller amount of current is utilized by the circuit 94.

In this manner, when the receiving circuitry 42 is enabled, such as when messages are being received by the radio receiver 40 (FIG. 2), the speed control signal supplied to the bus driver circuit 94 is low. As a result, the bus driver circuit 94 operates, in the manner described above, in a low current, low speed mode such that rise and fall times of the output signal are relatively slow and data is transferred over the communication bus 78 at a relatively slow data rate, e.g., 10 kbps–30 kbps. In this situation, the rise and fall times are preferably slow enough that communication over the communication bus 78 (FIG. 2) does not interfere with the performance of the receiving circuitry 42. When, on the other hand, the receiving circuitry 42 is disabled, the CPU 58

(FIG. 2) provides a high speed control signal, which results in high current, high speed operation of the bus driver circuit 94. In this mode, the rise and fall times of the output signal are relatively fast, and data transfer over the communication bus 78 occurs at a high data rate, e.g., 1 Mbps–10 Mbps. The communication at the high data rate is fast enough such that significant RF noise is generated, but, since the receiving circuitry 42 is disabled, the amount of noise generated is irrelevant.

Returning to FIGS. 4 and 5, the bus driver circuit 94 can, if desired, operate in a fourth mode, in which the enable signal is low and the speed control signal is high, as shown in the truth table of FIG. 5. However, it is intended that the bus driver circuit 94 will only be operated when the enable signal is high, and the microcomputer 44 will hold the speed control signal low when the enable signal is low, thereby disabling the bus driver circuit 94, as shown in the truth table.

Figures 8, 9:
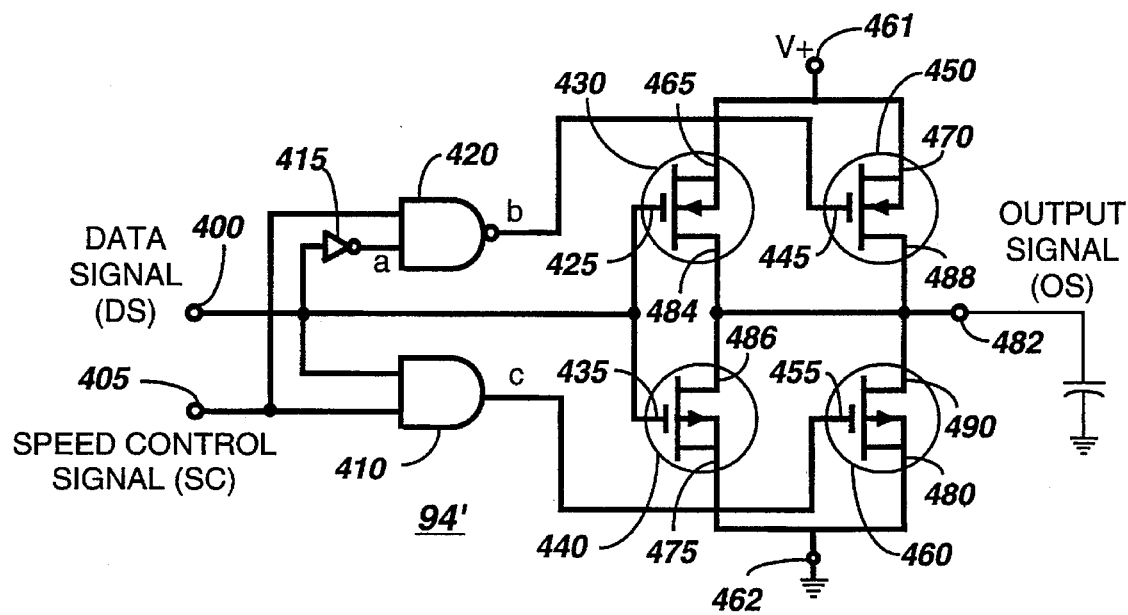
FIG. 8 is an electrical circuit diagram of a one-directional, dual speed bus driver circuit in accordance with a first alternate embodiment of the present invention.
FIG. 9 is a truth table showing the states of various nodes and transistors of the bus driver circuit of FIG. 8 in accordance with the first alternate embodiment of the present invention.

Referring next to FIG. 8, a one-directional, two speed bus driver circuit 94' in accordance with an alternate embodiment of the present invention is depicted. This one-directional bus driver circuit 94' could be utilized, for example, in situations wherein a first device, such as the microcomputer 44, continuously transmits information to other devices at two different speeds. The bus driver circuit 94' comprises a first terminal 400 for receiving a data signal (DS), which has high and low voltage levels, and a second terminal 405 for receiving a speed control signal (BC) generated by the transmitting device. The first terminal 400 is coupled to a first input of an AND gate 410 and to the input of an inverter 415, the output of which is coupled to a first input of a NAND gate 420. The second terminal 405 is coupled to the second input of the AND gate 410 and the second input of the NAND gate 420.

The first terminal 400 is further coupled to the gate electrode 425 of a first transistor 430, which is preferably an n-channel field effect transistor (FET), and to the gate electrode 435 of a second transistor 440, which is preferably a p-channel FET. Additionally, the output of the NAND gate 420 is coupled to the gate electrode 445 of a third transistor 450, which is preferably an n-channel FET. The gate electrode 455 of a fourth transistor 460, preferably a p-channel FET, is coupled to the output of the AND gate 410. According to the alternate embodiment of the present invention, a third terminal 461, to which a positive voltage (V+) is provided, is coupled to the source electrodes 465, 470 of transistors 430, 450, respectively, while the source electrodes 475, 480 of transistors 440, 460, respectively, are coupled to a fourth terminal 462. A supply voltage of approximately zero volts, i.e., ground, is preferably coupled to the fourth terminal 462. A fifth terminal 482 supplies an output signal (OS) over a communication bus and is coupled to the drain electrodes 484, 486, 488, 490 of each of the four transistors 430, 440, 450, 460, respectively.

The signal flow of the bus driver circuit 94' can be easily followed by further referencing both FIG. 8 and FIG. 9, which is a truth table showing the states of nodes a, b, and c and the operational states of transistors 430, 440, 450, 460 with respect to the data signal (DS) supplied at terminal 400 and the speed control signal (BC) supplied at terminal 405. When the speed control signal is low, indicating that receiving circuitry (not shown) is enabled, the output (node b) of the NAND gate 420 is always high, and, as a result, transistor 450 remains non-conductive. Additionally, the output (node c) of the AND gate 410 is low, thereby rendering transistor 460 non-conductive regardless of the voltage of the data signal supplied at terminal 400.

The states of transistors 430, 440 change according to the voltage at terminal 400 when the speed control signal is low. When the data signal supplied at terminal 400 is low, transistor 430 is rendered conductive, and transistor 440 is rendered non-conductive. In this instance, V+ is coupled to terminal 482 by transistor 430, thus providing a first predetermined current for effectively charging a capacitive load coupled to terminal 482. When the data signal is high, transistor 430 becomes non-conductive, and transistor 440 becomes conductive. As a result, terminal 482 is coupled, through transistor 440, to ground, thereby effectively discharging the capacitive load.

When the speed control signal is high, indicating that receiving circuitry (not shown) is disabled, and the data signal is low, the output (node a) of the inverter 415 is high. Therefore, the output (node b) of the NAND gate 420 is low, rendering transistor 450 conductive. The output (node c) of the AND gate 410 is low, and, as a result, transistor 460 is rendered non-conductive. At the same time, transistor 430 is rendered conductive, and transistor 440 is rendered non-conductive by the low data signal. Therefore, when the speed control signal is high and the data signal is low, both transistors 430 and 450 couple V+ to terminal 482, thereby charging the capacitive load faster than when only transistor 430 is conductive.

When the speed control signal is high, and the data signal is high, the output (node a) of the inverter 415 is low. Therefore, the output (node b) of the NAND gate 120 goes high, and transistor 450 is rendered non-conductive. At the same time, the output (node c) of the AND gate 110 goes high, and transistor 460 is rendered conductive. Furthermore, the high data signal renders transistor 430 non-conductive and transistor 440 conductive. As a result, both transistors 430, 450 are open, isolating V+ from terminal 482, and transistors 440, 460 are conductive, coupling terminal 482 to ground and discharging the capacitive load. In this instance, the capacitive load is discharged at a faster rate than when only transistor 440 provides a path between terminal 482 and ground, such as occurs when the speed control signal is low.

Figure 10:
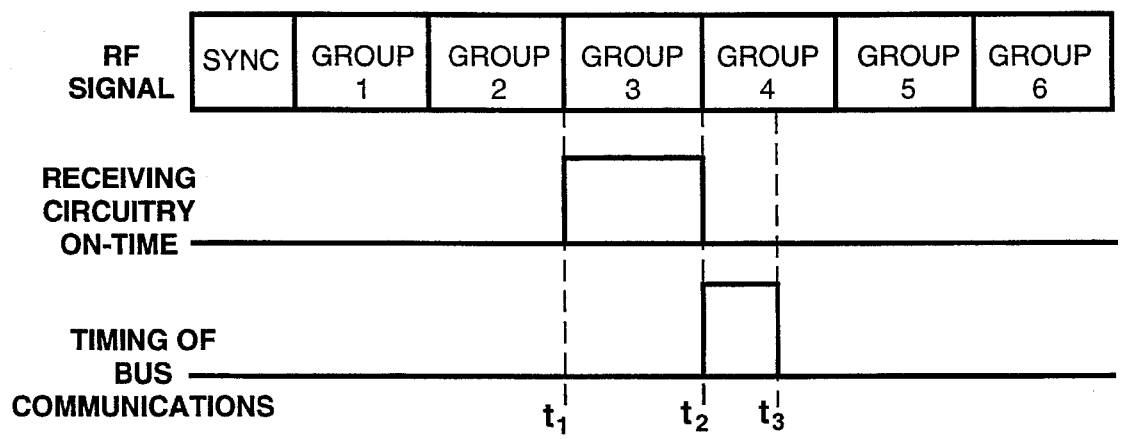
FIG. 10 is a timing diagram depicting the on-time of receiving circuitry included in a radio receiver and the timing of communications over a communication bus in accordance with a second alternate embodiment of the present invention.

FIG. 10 is a timing diagram depicting, in accordance with a second alternate embodiment of the present invention, the on-time of receiving circuitry included in a radio receiver and the timing of bus communications between a microcomputer and an expansion chip coupled to the microcomputer by a communication bus. According to the alternate embodiment of the present invention, communication over the communication bus is inhibited when the receiving circuitry is enabled, at time $t_1$, until the receiving circuitry is disabled, at time $t_2$. Therefore, no RF noise is generated by the communication bus while the receiving circuitry is enabled, and RF performance of the radio receiver is not degraded. After the receiving circuitry is disabled, at $t_2$, communication over the communication bus resumes between $t_2$ and $t_3$. During this time period, communication between the microcomputer and the expansion chip occurs at a high data rate. In accordance with this alternate embodiment, conventional bus driving circuitry, rather then the bus driver circuit 94 (FIG. 4), can be utilized because communication occurs only at a single high speed. However, operations, such as decoding or displaying, which require communication between the microcomputer and the expansion chip cannot be performed until the receiving circuitry has been disabled.

In summary, the radio receiver as described above utilizes conventional battery saving techniques to enable and disable receiving circuitry at predetermined times. When the receiving circuitry is enabled, data transfer between a microcomputer and an expansion chip occurs at a relatively slow data rate, wherein the data signal has slow rise and fall times. As a result, minimal RF noise is generated, and the receiving circuitry is not desensitized by the data signal. Alternatively, when the receiving circuitry is disabled, communication between the microcomputer and the expansion chip is resumed at a high data rate and intense RF noise can be generated. However, the performance of the radio receiver is not affected because the receiving circuitry is not receiving information.

In conventional radio receivers, communication over a communication bus occurs at high data rates even when receiving circuitry in the radio receiver is enabled. This high speed communication generates intense RF interference which can significantly degrade the performance of the receiving circuitry. As a result, information intended for reception by the radio receiver can be erroneously received or even entirely missed.

It may be appreciated by now that there has been provided a method and apparatus for controlling RF interference in an expanded microcomputer system having one or more chips inter-connected to a microcomputer by a communication bus.

What is claimed is:

1. A radio receiver for receiving an RF signal, comprising:

receiving circuitry for receiving and demodulating the RF signal;

a microcomputer coupled to the receiving circuitry for enabling and disabling the receiving circuitry at predetermined times;

an expansion chip coupled to and controlled by the microcomputer for communicating therewith to further process the RF signal; and wherein communication between the microcomputer and the expansion chip occurs at a first speed when the receiving circuitry is enabled and at a second speed faster than the first speed when the receiving circuitry is disabled.

2. The radio receiver according to claim 1, further comprising a communication bus coupled between the microcomputer and the expansion chip for providing communications thereover at the first and second speeds.

3. The radio receiver according to claim 2, wherein the microcomputer comprises:

a processing unit for generating a data signal having first and second voltage levels for transmission to the expansion chip and for generating a speed control signal having third and fourth voltage levels when the receiving circuitry is respectively disabled and enabled; and a bus interface coupled to the processing unit and the communication bus for processing the data signal to generate an output signal for transmission over the communication bus, wherein the output signal is characterized by first predetermined rise and fall times when the speed control signal is at the third voltage level and by second predetermined rise and fall times when the speed control signal is at the fourth voltage level, and wherein the second predetermined rise and fall times are faster than the first predetermined rise and fall times.

4. The radio receiver according to claim 3, wherein the bus interface comprises a dual speed bus driver circuit, comprising:

a first terminal for receiving the data signal;

a second terminal for receiving the speed control signal;

a third terminal coupled to the communication bus for providing the output signal thereto; and driving means coupled between the first, second, and third terminals for driving the communication bus with a first current when the speed control signal is at the third voltage level and for driving the communication bus with a second current higher than the first current when the speed control signal is at the fourth voltage level.

5. The radio receiver according to claim 4, wherein the driving means comprises:

a low speed transistor stage comprising:

a first transistor for coupling a positive voltage to the third terminal when the data signal is at the first voltage level, thereby supplying the first current to the third terminal; and a second transistor for coupling the third terminal to ground when the data signal is at the second voltage level.

6. The radio receiver according to claim 5, wherein the driving means further comprises:

a high speed transistor stage, comprising:

a third transistor for coupling the positive voltage to the third terminal when the data signal is at the first voltage level and the speed control signal is at the fourth voltage level, thereby supplying the second current to the third terminal; and a fourth transistor for coupling the third terminal to ground when the data signal is at the second voltage level and the speed control signal is at the fourth voltage level.

7. The radio receiver according to claim 6, wherein:

the second voltage level is greater than the first voltage level; and the fourth voltage level is greater than the third voltage level.

8. The radio receiver according to claim 6, wherein:

the first and third transistors are n-channel field effect transistors; and the second and fourth transistors are p-channel field effect transistors.

9. The radio receiver according to claim 6, wherein the driving means further comprises:

an inverter having an input coupled to the first terminal for inverting the data signal;

a NAND gate having first and second inputs coupled to the second terminal and an output of the inverter and having an output coupled to a gate electrode of the third transistor;

an AND gate having first and second inputs coupled to the first and second terminals and having an output coupled to a gate electrode of the fourth transistor; and wherein the first terminal is coupled to gate electrodes of the first and second transistors, source electrodes of the first and third transistors are coupled to the positive voltage, source electrodes of the second and fourth transistors are coupled to ground, and drain electrodes of the first, second, third, and fourth transistors are coupled to the third terminal.

10. The radio receiver according to claim 6, wherein:

the processing unit further generates an enable signal having fifth and sixth voltage levels;

the dual speed bus driver circuit further comprises a fourth terminal for receiving the enable signal;

the driving means is disabled when the enable signal is at the fifth voltage level and the speed control signal is at the third voltage level; and the sixth voltage level is greater than the fifth voltage level and the fourth voltage level is greater than the third voltage level.

11. The radio receiver according to claim 10, wherein the driving means further comprises:

first and second inverters having inputs coupled to the first terminal for inverting the data signal;

a first NAND gate having first and second inputs coupled to the second terminal and an output of the first inverter and having an output coupled to a gate electrode of the first transistor;

a second NAND gate having first and second inputs coupled to the fourth terminal and an output of the second inverter and having an output coupled to a gate electrode of the third transistor;

a first AND gate having first and second inputs coupled to the first and second terminals and having an output coupled to a gate electrode of the second transistor;

a second AND gate having first and second inputs coupled to the first and fourth terminals and having an output coupled to a gate electrode of the fourth transistor; and wherein source electrodes of the first and third transistors are coupled to the positive voltage, source electrodes of the second and fourth transistors are coupled to ground, and drain electrodes of the first, second, third, and fourth transistors are coupled to the third terminal.

12. A dual speed bus driver circuit for driving a communication bus, comprising:

a first terminal for receiving a data signal having first and second voltage levels;

a second terminal for receiving a speed control signal having third and fourth voltage levels;

a third terminal coupled to the communication bus for providing an output signal thereto; and driving means coupled between the first, second, and third terminals for driving the communication bus with a first current when the speed control signal is at the third voltage level and for driving the communication bus with a second current higher than the first current when the speed control signal is at the fourth voltage level.

13. The dual speed bus driver circuit according to claim 12, wherein the driving means comprises:

a low speed transistor stage comprising:

a first transistor for coupling a positive voltage to the third terminal when the data signal is at the first voltage level, thereby supplying the first current to the third terminal; and a second transistor for coupling the third terminal to ground when the data signal is at the second voltage level.

14. The dual speed bus driver circuit according to claim 13, wherein the driving means further comprises:

a high speed transistor stage, comprising:

a third transistor for coupling the positive voltage to the third terminal when the data signal is at the first voltage level and the speed control signal is at the fourth voltage level, thereby supplying the second current to the third terminal; and a fourth transistor for coupling the third terminal to ground when the data signal is at the second voltage level and the speed control signal is at the fourth voltage level.

15. The dual speed bus driver circuit according to claim 14, wherein:

the second voltage level is greater than the first voltage level; and the fourth voltage level is greater than the third voltage level.

16. The dual speed bus driver circuit according to claim 14, wherein:

the first and third transistors are n-channel field effect transistors; and the second and fourth transistors are p-channel field effect transistors.

17. The dual speed bus driver circuit according to claim 14, wherein the driving means further comprises:

an inverter having an input coupled to the first terminal for inverting the data signal;

a NAND gate having first and second inputs coupled to the second terminal and an output of the inverter and having an output coupled to a gate electrode of the third transistor;

an AND gate having first and second inputs coupled to the first and second terminals and having an output coupled to a gate electrode of the fourth transistor; and wherein the first terminal is coupled to gate electrodes of the first and second transistors, source electrodes of the first and third transistors are coupled to the positive voltage, source electrodes of the second and fourth transistors are coupled to ground, and drain electrodes of the first, second, third, and fourth transistors are coupled to the third terminal.

18. The dual speed bus driver circuit according to claim 14, further comprising a fourth terminal for receiving a enable signal having fifth and sixth voltage levels, wherein the driving means is disabled when the enable signal is at the fifth voltage level and the speed control signal is at the third voltage level, and wherein the sixth voltage level is greater than the fifth voltage level and the fourth voltage level is greater than the third voltage level.

19. The dual speed bus driver circuit according to claim 18, wherein the driving means further comprises:

first and second inverters having inputs coupled to the first terminal for inverting the data signal;

a first NAND gate having first and second inputs coupled to the second terminal and an output of the first inverter and having an output coupled to a gate electrode of the first transistor;

a second NAND gate having first and second inputs coupled to the fourth terminal and an output of the second inverter and having an output coupled to a gate electrode of the third transistor;

a first AND gate having first and second inputs coupled to the first and second terminals and having an output coupled to a gate electrode of the second transistor;

a second AND gate having first and second inputs coupled to the first and fourth terminals and having an output coupled to a gate electrode of the fourth transistor; and wherein source electrodes of the first and third transistors are coupled to the positive voltage, source electrodes of the second and fourth transistors are coupled to ground, and drain electrodes of the first, second, third, and fourth transistors are coupled to the third terminal.

20. A method for controlling radio frequency (RF) interference in an expanded microcomputer system comprising a microcomputer coupled by a communication bus to an expansion chip for communicating therewith to process RF signals received by receiving circuitry, the method comprising the steps of:

(a) enabling the receiving circuitry at a first predetermined time such that the receiving circuitry is able to receive an RF signal;

(b) communicating with the expansion chip at a first speed when the receiving circuitry is enabled;

(c) disabling the receiving circuitry at a second predetermined time such that the receiving circuitry is unable to receive the RF signal; and (d) communicating with the expansion chip at a second speed when the receiving circuitry is disabled, wherein the second speed is faster than the first speed.

21. The method according to claim 20, wherein step (b) comprises the steps of:

(e) generating a first data signal at a first data rate for transmission over the communication bus; and (f) driving the communication bus with a first current such that the first data signal is characterized by first predetermined rise and fall times.

22. The method according to claim 21, wherein step (d) comprises the steps of:

(g) generating a second data signal at a second data rate faster than the first data rate for transmission over the communication bus; and (h) driving the communication bus with a second current such that the second data signal is characterized by second predetermined rise and fall times, wherein the second current is higher than the first current and the second predetermined rise and fall times are faster than the first predetermined rise and fall times.

* * * * *